United States Patent Office 3,726,887
Patented Apr. 10, 1973

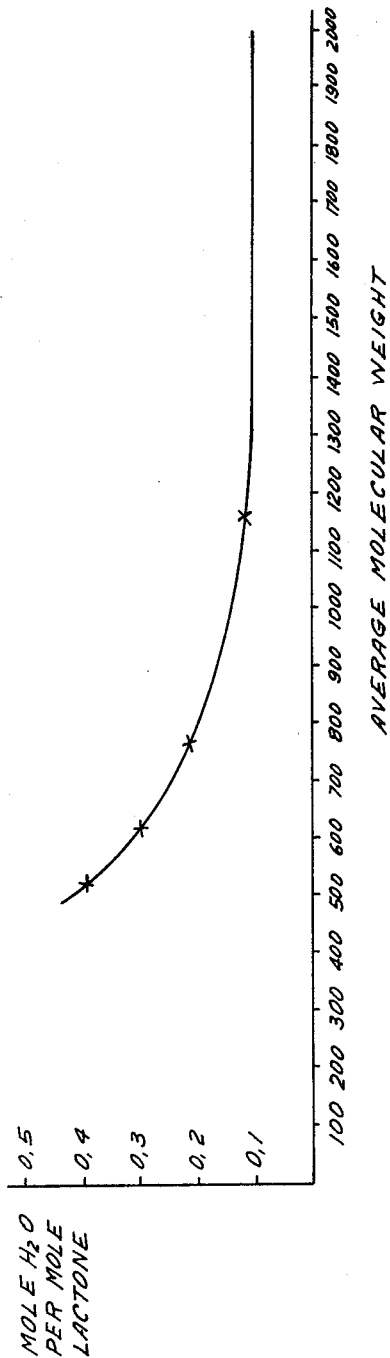

3,726,887
PROCESS OF MAKING POLYESTERPOLYOLS
Gerhard Pohl, Grossauheim, Karl-Heinz Rink, Hanau, and Wolfgang Triebel, Grossauheim, Germany, assignors to Deutsche Gold- und Silber-Scheideanstalt vormals Roessler, Frankfurt am Main, Germany
Filed July 20, 1970, Ser. No. 56,414
Claims priority, application Germany, July 18, 1969, P 19 36 587.8
Int. Cl. C07c 69/66
U.S. Cl. 260—484 A     11 Claims

ABSTRACT OF THE DISCLOSURE

Polyesterpolyols are made by subjecting a lactone of the formula

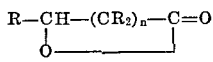

in which R is hydrogen or alkyl of 1–10 carbon atoms and $n$ is an integer from 4 to 10, to polymerization in the presence of water, an alkali hydroxide, an earth alkali hydroxide or a mixture of these hydroxides or of water with these hydroxides, the water or hydroxides or mixtures thereof being present in an amount between about 0.03 and 1.0 mole for each mole of lactone and the reaction being effected at a temperature between about 50 and 300° C.

There is thus formed an ω-hydroxy-polylactone carboxylic acid which then is esterified with a polybasic alcohol to form the polyesterpolyol.

BACKGROUND OF THE INVENTION

Polyesterpolyols have been made previously by polymerizing lactones with compounds, particularly organic compounds, adapted to open up the lactone ring. Initiators for this ring-opening step are usually compounds that have at least one hydroxyl or amino group. This polymerization is effected at a temperature between 50 and 300° C. and preferably in the presence of a catalyst; see German published application 1,217,019.

A shortcoming in this process is that comparatively long periods of time are necessary for the polymerization, for instance between 24 and 72 hours. With shorter reaction times, there is danger that the reaction remains incomplete and that excess hydroxyl or amino groups-containing compounds contaminate the reaction product. These compounds are difficult to separate out and interfere with the further reaction of the polyesterpolyols, for instance, with diisocyanates.

It is therefore an object of the invention to provide for a process for making polyesterpolyols with predetermined molecular weight in industrially desirable short reaction times of periods between one and six hours.

SUMMARY OF THE INVENTION

This object is met by subjecting a lactone of the formula

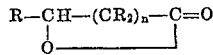

in which R is hydrogen or alkyl of 1–10 carbon atoms and $n$ is an integer from 4 to 10, to polymerization in the presence of water or an alkali hydroxide or earth alkali hydroxide or a mixture of these additives, the water or hydroxides being present in amounts between 0.03 and 1.0 mole for each mole of lactone. The reaction is effected at a temperature between about 50 and 300° C. In the reaction the lactone ring is opened and an ω-hydroxy-polylactone carboxylic acid is formed with an average molecular weight between about 300 and 3000. This acid may or may not be isolated. In the next step the acid is esterified with a polybasic alcohol to form the polyester polyol.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing shows the relation between the average molecular weight and the amounts of water or alkali or earth alkali hydroxide which are used in the reaction.

DESCRIPTION OF THE PREFERRED EMBODIMENTS

The preferred range of water and/or alkali and/or earth alkali hydroxide is 0.1 to 0.5 mole for each mole of lactone.

The preferred polymerization temperature is between 150 and 200° C. The polymerization may also be effected upon application of pressure.

The preferred esterification temperature is between 150 and 200°. Preferably, the esterification is effected in a vacuum. The preferred esterifying agent is a dibasic alcohol.

The ω-hydroxy-polylactone carboxylic acid which is obtained as an intermediate product may be isolated prior to esterification. This, however, is not absolutely necessary.

The average molecular weight of the ω-hydroxy-polylactone carboxylic acid can be adjusted depending on the amount of water or alkali or earth alkali hydroxide within the range between about 300 and 3000. For instance, if one mole of ω-hydroxy-polylactone carboxylic acid is esterified with 1 mole of a diol, the resulting polyesterdiol will have a molecular weight corresponding to the sum of the molecular weights of acid and diol minus the driven-off water. It is, however, also possible to form higher molecular weight polyesterdiols from the same components by reacting two moles of ω-hydroxy-polylactone carboxylic acid with 1 mole of diol. As compared with the reaction at a molar ratio of 1:1, the molecular weight of the reaction product in case of a molar ratio of 2:1 will increase by the molecular weight of the ω-hydroxypolylactone carboxylic acid which is employed.

In order to adjust the average molecular weight to a predetermined value between about 1000 and 3000, it is necessary to use the theoretical amount of water or alkali or earth alkali hydroxide. For average molecular weights which are below 1000, however, a larger amount than the theoretical amount is required in the sense that the excess must be so much higher as the desired average molecular weight is intended to be smaller. For instance, if the average molecular weight is intended to be 300, 0.3 mole water or alkali hydroxide or earth alkali hydroxide must be used for each mole of lactone.

The relation between the average molecular weight of the employed amounts of water or alkali hydroxide or earth alkali hydroxide is further illustrated in the drawing, which refers to a reaction at the temperature of 150° C. and at a pressure between about 10 and 30 atm. above atmospheric pressure. Intermediate values can easily be calculated by interpolation.

If other temperatures are used, the required excess amounts vary only to a minor extent in the sense that lower temperatures a slightly lower excess is necessary than at higher temperatures. As against the preferred reaction temperature of 150° C. the excess amount varies only by about 3 to 4% per 10° C. This percentage amount has to be deducted if the temperature of 150° C. is not reached and it has to be added if this temperature is exceeded.

The process of the invention results in the first place in ω-hydroxy-polylactone carboxylic acids which are colorless materials of a consistency between liquid and waxy and in cases even solid. They are of good solubility in conventional organic solvents, particularly acetone. If, in the first stage of the process, an alkali or earth alkali hydroxide is used instead of water, the corresponding salt is obtained. The potassium hydroxide is preferred as the hydroxide. This reaction likewise requires only a short time and is slightly exothermic. The reaction product is obtained in practically quantitative yield and likewise has the solution properties indicated above.

The reaction of the ω-hydroxy-polylactone carboxylic acids or their salts with the polyhydric, preferably dihydric, alcohols to form the polyesterpolyols with hydroxyl end groups is preferably carried out by vacuum esterification since in that case mild reaction conditions can be used and still a high reaction speed will be obtained.

The lactones used as starting products may for instance be the following: ε-caprolactones, e.g. monoalkyl-ε-caprolactone, dialkyl-caprolactones, alkoxycaprolactones, cyclohexyl- and phenylcaprolactone and lactones with more than 6 carbon atoms in the ring. The preferred lactone is the ε-caprolactone.

The polyhydric alcohols which can be used in the process of the invention are: glycol, dialkyleneglycol, triethyleneglycol, 1,4-butanediol, 1,6-hexanediol, glycerin, pentaerythrite. The preferred alcohol is diethyleneglycol.

These alcohols are employed in stoichiometric amounts in the reaction with the ω-hydroxy-polylactone carboxylic acids obtained in the first stage. This should be understood to mean that at least one hydroxyl group of the diol or polyol is esterified with one carboxylic acid group of the acid. It is, however, also possible to esterify two carboxylic acids groups with diols, three such groups with triols, and if tetrahydric alcohols are used four hydroxyl groups can be esterified in stages with the corresponding amounts of ω-hydroxy-polylactone carboxylic acids.

The polymerization of the invention is preferably carried out in absence of a polymerization catalyst. However, it is also possible to employ acid catalysts such as lead acetate, zinc chloride, boron trifluoride, aluminum chloride, sulfuric acid, etc.

The esterification is however preferably carried out in the presence of catalyst. Examples for such catalysts are p-toluene-sulfonic acid, napthalene-sulfonic acid and butyltitanate.

The polyesterpolyols obtained in the process of the invention are useful as antifriction and separation agents and softeners in the manufacture of polymers. They also are the starting products for making polyurethanes.

The intermediate products of the invention, the ω-hydroxy-polylactone carboxylic acids are useful for reaction with diisocyanates, particularly in connection with the manufacture of polyurethane foams. The diols and hydroxycarboxylic acids are also useful in the manufacture of lacquers and synthetic resins.

As compared with conventional products of this type, the products obtained in the invention have a substantially uniform molecular weight distribution. They are therefore useful as raw materials for the synthesis of macromolecules, for instance of polyurethanes which should have a predetermined chain length and sequence of the individual units. This property in turn is useful for the properties of the polymers, for instance resistance to cold, elasticity, aging and weather resistance are improved thereby.

The process of the invention can be carried out continuously in a reaction vessel. If desired, it is possible to employ pressure. Preferred is the reaction between 150 and 200° C.

Of advantage is the use of a reaction pipe which may be of coiled structure. In a pipe of this type it is possible to make the ω-hydroxy-polylactone carboxylic acids in a continuous process from caprolactone and water and then to pass the acid into an intermediate reaction vessel where the pressure is released and where the acid may be stored or where the esterification polyol may be added in a continuous process, if desired, together with a catalyst and wherefrom the mixture may be passed in a continuous process to the vacuum esterification apparatus.

The following examples will further illustrate the invention.

EXAMPLE 1

228 g. of caprolactone were mixed 14.4 g. of distilled water in a molar ratio of caprolactone to water equal to 1:4.0. The mixture was heated in an autoclave supplied with a stirrer for 2 hours to a temperature of 150° C. while applying a nitrogen pressure of 10 atm. above atmospheric. The caprolactone ring was thus split open and polymerization effected, resulting in an ω-hydroxy-polylactone carboxylic acid. The reaction product was then heated in an oil bath (120° C.) and a vacuum of 0.2 mm. Hg for 1 hour to remove residual monomers. A polycaprolactone was thus obtained having a contents of 8.25% carboxylic acid groups corresponding to a yield of 89% of the theoretical yield. The molecular weight was calculated as being 545, by the vapor pressure method it was determined as 525.

Based on the molar ratio of caprolactone to water of 1:0.4 in the initial mass, an average molecular weight of 300 should have been expected if the reaction had used up all of the water.

200 g. of this polycaprolactone hydroxycarboxylic acid were then esterified with 33 g. of 1,4-butane diol (molar ratio of 1:1) and 2 g. of p-toluene-sulfonic acid by heating the mass for 1 hour in a vacuum (50 mm. Hg) to 150° C. The reaction water was distilled off and a white caprolactone polyesterdiol remained as residue.

EXAMPLE 2

228 g. of caprolactone were mixed with 10.8 g. of distilled water (molar ratio of caprolactone to water equal to 1:0.3) and were heated in an autoclave provided with stirrers for 2 hours to 150° C. in a nitrogen atmosphere at 10 atm. above atmospheric pressure. The mixture was then distilled for an hour in an oil bath at a temperature of 120° C. and a vacuum of 0.2 mm. Hg in order to remove the residual monomers. A polylactone hydroxycarboxylic acid was obtained with a carboxylic acid group contents of 6.9% which gave a molecular weight of 655. The yield accordingly was 93% of the theoretical yield. The molecular weight obtained by the vapor pressure method was 628. Based on the amount of water employed the molecular weight should have been 396.

The polycaprolactone hydroxycarboxylic acid in an amount of 200 g. was then esterified with 36.5 g. of 1,6-hexanediol (molar ratio 1:1) and 2 g. of p-toluene-sulfonic acid by heating to 150° C. for a period of 2 hours in a vacuum of 50 mm. Hg. The corresponding caprolactone polyesterdiol was obtained in a quantitative yield as residue.

EXAMPLE 3

228 g. of caprolactone were mixed with 7.2 g. of distilled water (molar ratio 1:0.2) by heating in an autoclave equipped with a stirrer for a period of 2 hours to 150° C. in a nitrogen atmosphere at 30 atm. above atmospheric. The mass was then distilled for 1 hour at 120° C. and 0.2 mm. Hg vacuum in order to remove residual monomers. The white, waxy polycaprolactone hydroxycarboxylic acid was obtained in a yield of 95% of the theoretical yield. The acid had a molecular weight of 780 determined from the carboxylic acid group contents of 5.8%. Experimentally the molecular weight was ascertained as 758. In case of a quantitative reaction of the water, the molecular weight should have been 588.

200 g. of the polycaprolactone hydroxycarboxylic acid thus obtained were homogenized with 27 g. of triethylene glycol (molar ratio of 1:1) while adding 2 g. p-toluene sulfonic acid by heating the mass to 150° C. for 1 hour at 50 mm. Hg. The reaction product was the corresponding white polyester diol.

EXAMPLE 4

228 g. of caprolactone were mixed with 3.6 g. of distilled water (molar ratio 1:0.1) and heated in an autoclave provided with a stirrer to a temperature of 150° C. for 2 hours at a nitrogen pressure of 30 atm. above atmospheric. The mass was then distilled in an oil bath at a temperature of 120° C. and a vacuum of 0.2 mm. Hg for 1 hour in order to remove the residual monomers. A white, waxy polycaprolactone hydroxylic carboxylic acid was obtained in a yield of 95% which, determined from the carboxylic acid group contents of 4.0%, had a molecular weight of 1130. The molecular weight which should have been expected on the basis of the added amount of water was 1158. 200 g. of this polycaprolactone hydroxycarboxylic acid were homogenized at a molar ratio of 1:1 with 26.5 g. of triethylene glycol and 2 g. of p-toluenesulfonic acid. The step was effected by heating for 1 hour to 150° C. at 50 mm. Hg. The reaction water was removed by distillation. The corresponding polyesterdiol was received as the residue.

EXAMPLE 5

228 g. of caprolactone were mixed with 10.8 g. of distilled water (molar ratio 1:0.3) and 0.2 g. of lead acetate and then heated in an autoclave provided with a stirrer for 2 hours to 150° C. at 10 atm. above atmospheric nitrogen pressure. The polycaprolactone ω-hydroxycarboxylic acid was obtained in a yield of 94% and the molecular weight was determined as 1145. From the carboxylic acid group contents of 3.8% a molecular weight of 1190 was calculated.

200 g. of the polycaprolactone hydroxycarboxylic acid were heated together with 27.5 g. of 1,4-butanediol (molar ratio 1:1) and 2 g. of p-toluene sulfonic acid to 150° C. during 2 hours at 50 mm. Hg. The reaction water was distilled off. As a residue there remained the corresponding polyesterdiol.

EXAMPLE 6

228 g. of caprolactone were mixed with 3.6 g. distilled water (molar ratio 1:0.1). The mixture was then heated in an autoclave in the presence of 0.25 g. zinc chloride to a temperature of 150° C. during a period of 2 hours at 30 atm. above atmospheric nitrogen pressure. The polycaprolactone ω-hydroxycarboxylic acid was obtained in a yield of 96% with a calculated molecular weight of 1145. The molecular weight computed from the carboxylic acid group contents of 3.8% was 1190. On the basis of the used up water amount, the molecular weight should have been 1158.

200 g. of the polycaprolactone hydroxycarboxylic acid were heated in a molar ratio of 1:1 with 15.3 g. of 1,4-butanediol and 2 g. of p-toluene sulfonic acid for 1 hour to 150° C. at 50 mm. Hg. The water of reaction was distilled off. There remained the corresponding polyesterdiol as the residue.

EXAMPLE 7

228 g. of caprolactone were heated with 10.8 g. distilled water (molar ratio 1:0.3) in a stirring apparatus for 6 hours to 90° C. without application of pressure. After subjecting the mass to vacuum distillation, the polycaprolactone ω-hydroxycarboxylic acid was obtained in a yield of 87% of the theoretical yield with a calculated molecular weight of 491. From the carboxylic acid group contents of 8.9% the molecular weight would have been 510.

150 g. of the polycaprolactone hydroxycarboxylic acid were heated with 31 g. triethyleneglycol (molar ratio 1:1) and 2 g. of p-toluenesulfonic acid to 150° C. during one hour at 50 mm. Hg. The corresponding polyesterdiol was obtained as the reaction product.

EXAMPLE 8

228 g. of caprolactone were heated with 3.6 g. distilled water (molar ratio 1:0.1) in an autoclave provided with a stirrer to 200° C. for one hour at 30 atm. above atmospheric nitrogen pressure. The polylactone ω-hydroxycarboxylic acid was obtained in a yield of 93% with a calculated molecular weight of 1280. Based on the carboxylic acid group of contents of 3.8%, the molecular weight would have been 1190. On the basis of the used up amount of water, the theoretical molecular weight should have been 1158.

200 g. of the polycaprolactone hydroxycarboxylic acid were heated at a molar ratio of 2:1 with 9 g. of triethyleneglycol and 2 g. p-toluenesulfonic acid to 150° C. for one hour at 50 mm. Hg. The corresponding polyesterdiol was obtained as the reaction product.

EXAMPLE 9

In order to esterify the carboxylic acid end group, 175 g. of polycaprolactone ω-hydroxycarboxylic acid with an experimentally measured molecular weight of 1140 were reacted with 13.9 g. of 1,4-butanediol (molecular ratio lactone:diol=1:1), 0.5 g. of p-toluenesulfonic acid using 250 cc. benzene as extracting agent. The reaction was carried out for 6 hours and water separated out. The polyesterdiol was obtained in a yield of 97% with a measured molecular weight of 1210.

EXAMPLE 10

In order to esterify the carboxylic acid end group 175 g. of polycaprolactone ω-hydroxycarboxylic acid of a measured molecular weight of 1050 were reacted with 7.9 g. of 1,4-butanediol (molar ratio lactone:diol=2:1), 0.5 g. p-toluenesulfonic acid, and 250 cc. benzene as extraction agent, and water was separated out during the reaction. After an esterification time of 6 hours, the final product was extracted in a yield of 97% as a polyesterdiol having an experimentally measured molecular weight of 2050.

EXAMPLE 11

114 g. of caprolactone were heated while stirring with 6 g. anhydrous calcium hydroxide for 1 hour to a temperature of 180° C. After cooling the calcium salt of the ω-hydroxycaprolactone carboxylic acid was obtained in more or less quantitative yield as a white, solid mass. The polymer which was soluble in acetone had a molecular weight of 2704 determined by the vapor pressure method.

The calcium salt could be used for reactions, for instance, with diisocyanates directly as the diol. However, it is also possible to convert it to the free acid, for instance by reaction with oxalic acid and separation of the precipitated calcium oxalate. The hydroxycarboxylic acid thus obtained was then esterified with a polybasic alcohol upon formation of a polyesterdiol or a polyester polyol.

Without further analysis, the foregoing will so fully reveal the gist of the present invention that others can by applying current knowledge, readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An improvement in the process of making polyesterpolyols by subjecting a lactone of the formula

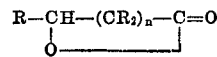

in which R is hydrogen or alkyl of 1–10 carbon atoms and n is an integer from 4 to 10, to polymerization and subsequent esterification of the polymerizate with a polybasic alcohol, the said improvement consisting in carrying out the polymerization in the presence of water, an alkali hydroxide, an earth alkali hydroxide or a mixture of these materials, the water or hydroxides or mixture thereof being present in an amount between about 0.03 and 1.0 mole for each mole of lactone and effecting the polymerization at a temperature between about 50 and 300° C. whereby the lactone ring is opened and an ω-hydroxy polylactonecarboxylic acid or, if said alkali hydroxide is used, the corresponding salt is formed, the said acid or salt having an average molecular weight of a predetermined value in the range between about 300 and 3000, and then esterifying the ω-hydroxy polylactonecarboxylic acid thus obtained with the polybasic alcohol to form the polyester-polyol, this esterification step being effected in case of the salt after conversion of the salt to the free acid.

2. The process of claim 1, wherein the polymerization is carried out in the presence of an acid catalyst.

3. The process of claim 2, wherein the acid catalyst is lead acetate, zinc cholride, boron trifluoride, aluminum chloride or sulfuric acid.

4. The process of claim 1 wherein the esterification is carried out in the presence of a catalyst selected from the group consisting of p-toluene-sulfonic acid, naphthalene-sulfonic acid and butyltitanate.

5. The process of claim 1 wherein the polymerization temperature is between about 150 and 200° C.

6. The process of claim 1 wherein the polymerization is effected upon application of pressure.

7. The process of claim 2 wherein the water or hydroxide is present in a molar ratio between 0.1 and 0.5 for each mole of lactone.

8. The process of claim 2 wherein the ω-hydroxy polylactone carboxylic acid obtained as the intermediate product is isolated prior to said esterification step.

9. The process of claim 1 wherein the lactone employed as starting product is selected from the group consisting of ε-caprolactones, monoalkyl-ε-caprolactones, dialkyl-caprolactones, and lactones having more than 6 carbon atoms in the ring.

10. The process of claim 2 wherein the polyhydric alcohol is selected from the group consisting of glycols, dialkyleneglycols, triethyleneglycol, 1,4 - butanediol, 1,6-hexanediol, glycerine, pentaerythrite, and diethyleneglycol.

11. The process of claim 1 wherein the lactone employed as starting product is an ε-caprolactone and wherein the alcohol used for the esterification is diethyleneglycol.

References Cited
UNITED STATES PATENTS

| | | | |
|---|---|---|---|
| 2,929,827 | 3/1960 | Carruthers | 260—484 R |
| 2,526,554 | 10/1950 | Gresham et al. | 260—484 R |
| 2,568,619 | 9/1951 | Gregory | 260—484 R |

LORRAINE. A. WEINBERGER, Primary Examiner

P. J. KILLOS, Assistant Examiner

U.S. Cl. X.R.

260—78.3 R, 410.6, 468 K, 473 R